(12) United States Patent
Zeliff et al.

(10) Patent No.: US 8,467,186 B2
(45) Date of Patent: Jun. 18, 2013

(54) TABLET PC COVER WITH INTEGRAL KEYBOARD

(75) Inventors: Zachary Joseph Zeliff, Taipei (TW); Yueh-Hua Li, Taipei (TW); Chia-Yeh Kung, Taipei (TW); Kristopher James Perpich, Austin, TX (US); Kuang-Yuan Tsai, Taipei (TW); Kevin S. Smith, Taipei (TW)

(73) Assignee: Adonit Co. Ltd., Taipei (TW)

( * ) Notice: Subject to any disclaimer, the term of this patent is extended or adjusted under 35 U.S.C. 154(b) by 0 days.

(21) Appl. No.: 13/304,647

(22) Filed: Nov. 26, 2011

(65) Prior Publication Data
US 2012/0140396 A1 Jun. 7, 2012

Related U.S. Application Data

(60) Provisional application No. 61/420,761, filed on Dec. 7, 2010.

(51) Int. Cl.
*G06F 1/16* (2006.01)
*G06F 3/02* (2006.01)
*G06F 3/041* (2006.01)

(52) U.S. Cl.
USPC ............ 361/679.56; 361/679.55; 361/679.26; 361/679.29; 345/168; 345/169; 345/173

(58) Field of Classification Search
USPC ............ 361/679.01–679.45, 679.55–679.59; 345/168, 169, 173; 206/45.24, 320
See application file for complete search history.

(56) References Cited

U.S. PATENT DOCUMENTS

| | | | |
|---|---|---|---|
| 6,780,019 B1 * | 8/2004 | Ghosh et al. | 439/31 |
| 6,829,140 B2 * | 12/2004 | Shimano et al. | 361/679.09 |
| 8,369,074 B2 * | 2/2013 | Chou et al. | 361/679.09 |
| 2006/0007645 A1 * | 1/2006 | Chen et al. | 361/681 |
| 2007/0176902 A1 * | 8/2007 | Newman et al. | 345/168 |

* cited by examiner

Primary Examiner — Jayprakash N Gandhi
Assistant Examiner — Nidhi Desai

(57) ABSTRACT

A cover for a tablet PC with an integral keyboard provides two outer covering faces and a resilient mounting frame fixing a tablet PC therein, hinged on a keyboard component. By hinging partway along one outer covering face, the mounting frame can assume a wide variety of angles. The keyboard component has embedded within its underside a ferromagnetic member attracted by an embedded metal strip in the other covering face, fixing the keyboard and mounting frame at any desired angle. The resilient mounting frame has an ejection assembly opposite the hinging of the resilient mounting frame and keyboard component, allowing one-handed release of the tablet PC, and an embedded implant corresponding to and detectable by a configurable circuit board encased in the keyboard component.

4 Claims, 4 Drawing Sheets

TABLET PC COVER WITH INTEGRAL KEYBOARD

BACKGROUND OF THE INVENTION

1. Field of the Disclosure

The disclosure relates to computer accessories, and more specifically, to a cover for a tablet PC with an integral keyboard.

2. Description of the Related Art

With recent innovations in touch screen function and application development, tablet PCs are experiencing a dramatic surge in popularity.

A popular tablet PC provides all the functions of a standard desktop or notebook PC, but, rather than relying on a keyboard and mouse for data input and operation control, provides full access through touch screen function integrated into the display.

While certain available applications provide a virtual on-screen keyboard allowing basic input of text characters, response and behavior of the simulated keyboard is severely limited, rendering everyday use of the tablet PC impractical. One solution to this problem has previously been to provide a docking station for the tablet with attached or integral keyboard. Such solution, however, negates the portability advantage of the tablet PC. While portable keyboards are available, accompanying transport of these devices with the tablet again compromises convenience.

One recently popular solution has been to integrate a keyboard component into a folio-style cover for the tablet PC, wherein, when closed, the tablet PC can be transported with minimal added size or weight, and, when opened, can be supported substantially perpendicular to a supporting surface with a usable keyboard situated for use at the front bottom edge of the tablet PC, presenting a configuration essentially the same as a deployed notebook computer. Such covers provide the added advantage of protection for the surface and touch panel during transport and storage.

However, certain of these cover types, in the interest of portability, provide only a thin mat-type keyboard which stows compactly for transport. As is known, though, such keyboards provide a considerably diminished experience of the user in terms of effective input.

Further, when deployed, many folio-type covers allow the tablet PC to be supported at only a single, or, at most, few, angles to the supporting surface. Given the known limitations of LCD viewing, in response to varying environmental illumination conditions, such restrictions can negatively affect the usability of the tablet PC, diminishing the inherent portability advantage thereof.

As well, in most covers, removal of the tablet PC from the cover for handheld use in its originally conceived configuration is complicated and unwieldy.

Finally, when use of the tablet PC in the cover is complete, and the entire apparatus is to be prepared for transport, it is necessary for the tablet PC to be manually shut down or placed in power-saving suspension mode, and the keyboard to be turned off, to avoid unwanted activation or operation. While many currently manufactured notebook computers utilize a magnetic proximity system to automatically shut down the tablet PC or place the tablet PC in power-saving suspension mode and turn off the keyboard, folio-type tablet PC covers provide either no such means, or provide a protruding button-like control to perform the required actions, either by manual activation or being configured to activate automatically when the structure is collapsed. Even so, such controls interrupt the aesthetic continuity of the cover, and are prone to breakage and malfunction.

Thus, what is called for is a solution addressing the described limitations.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
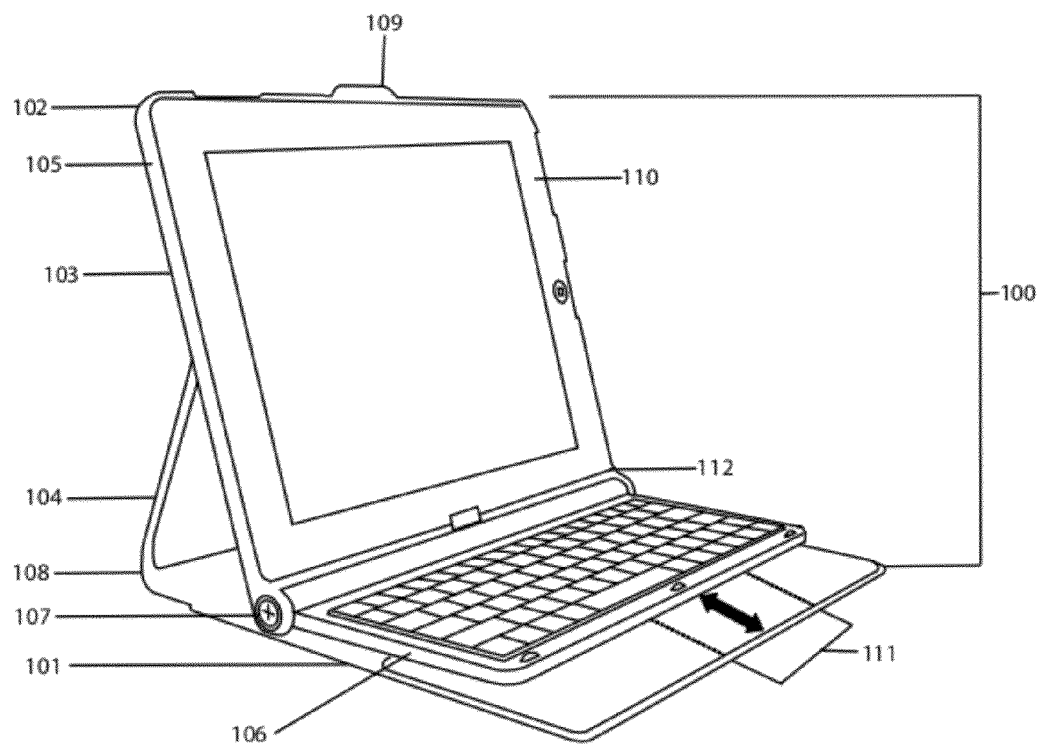
FIG. 1 shows a cover for a tablet PC as disclosed, with an integral keyboard movable, as shown by the arrow, through a wide range of positions, thereby adjusting the viewing angle of a tablet PC seated therein.

As shown in FIG. 1, a tablet PC cover with integral keyboard as disclosed 100 comprises a first outer covering face 101 hinged on a second outer covering face 102. The first outer covering face 101 is planar and rigid, forming a back side of the cover 100 when collapsed for storage or transport. The second outer covering face 102 is planar and rigid, but scored longitudinally (not shown), presenting at least two planar sections 103 and 104, which, by hinging along the scoring, can form a variable angle therebetween. The second outer covering face 102 forms a front side of the cover when collapsed for storage or transport.

The tablet PC cover 100 as disclosed further comprises, between the two outer covering faces 101 and 102, a mounting frame 105, and keyboard component 106, hinging on each other by, in this embodiment, a barrel hinge 107. In this embodiment, the barrel hinge runs along a longitudinal axis of the tablet PC cover 100. When the tablet PC cover is collapsed, the barrel hinge snugly abuts the inner side of the hinge 108 connecting the two outer covering faces.

The mounting frame 105 is attached on its rear side to the portion of the second outer covering face 102 between the longitudinal scoring and the outer edge thereof, hinging along the scoring and supported by the unattached section of the second outer covering face 102 between the longitudinal scoring and the hinged connection 108 with the first outer covering face 101. The mounting frame 105, on its surface away from the second outer covering face, comprises a fixing rim and an ejection assembly 109. Here, the ejection assembly 109 is situated at the essential center of the longitudinal edge opposite the barrel hinge 107, although alternative locations for the assembly 109 are equally applicable. The ejection assembly 109 here comprises a contact opening with clips on either side thereof. At least one clip is situated on either side of the contact opening. The contact opening exposes a portion of the rear side of a tablet PC 110 seated therein.

When deployed for use, the mounting frame 105 snugly secures the tablet PC 110 within the fixing rim around the periphery thereof. The operating touch panel and all controls of the tablet PC are exposed and functional. The tablet PC is secured within the fixing rim by at least resilient tension provided thereby and the fixing clips of the ejection assembly 109.

Figure 2:
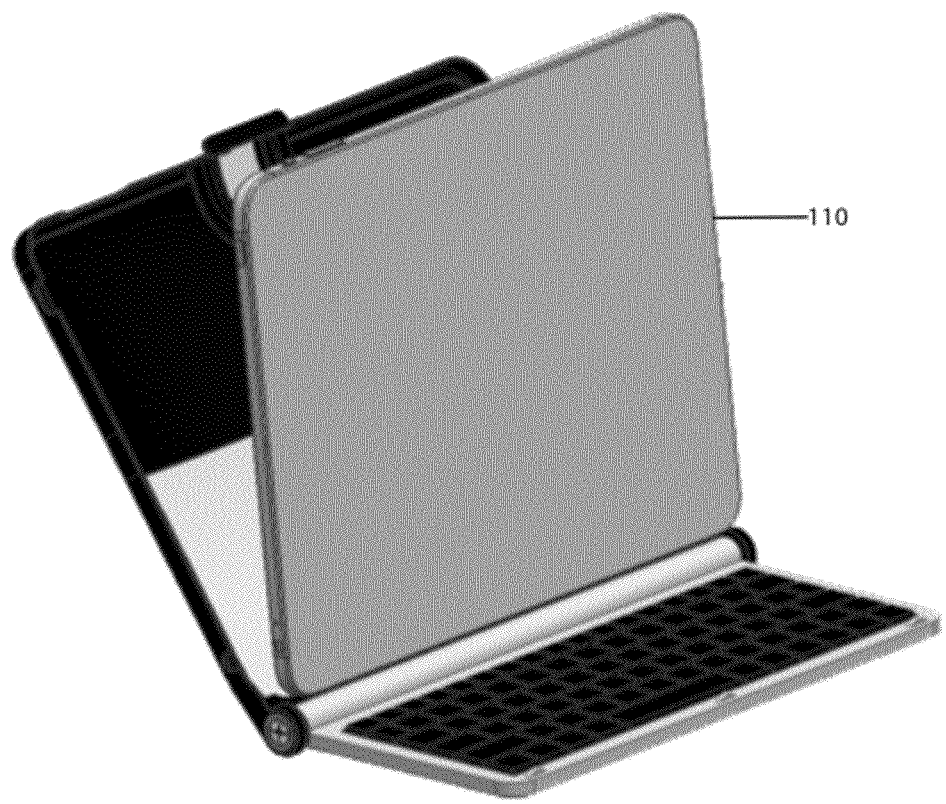
FIG. 2 is partial detail of the cover for a tablet PC of FIG. 1, showing the tablet PC disengaged therefrom.

If the tablet PC 110 is to be removed from the cover 100 for conventional handheld tablet operation, a user simply exerts pressure from the rear on the portion of the rear surface of the tablet PC 110 exposed by the contact opening, while bracing the edge of the fixing rim. The pressure exerted releases the tablet PC 110 by separating the fixing rim from the hold thereof and simultaneously releasing the clips. As shown in FIG. 2, removal of the tablet PC 110 is thus quickly and easily accomplished with a single one-handed action.

Further, referring again to FIG. 1, when deployed, the keyboard component 106 is supported on the plane of a supporting surface, directly on the inside of the first outer covering face 101, which rests directly on the supporting surface. A running track 111, indicated here by dotted lines, comprising, in this embodiment, a strip of metallic material, is encased within the first outer covering face 101, running between and perpendicular to the barrel hinge 107 and opposite outside edge thereof. The keyboard component 106 has, embedded in its base, at least one first ferromagnetic implant (not shown). When the keyboard component 106 is deployed for use, the at least one first ferromagnetic implant aligns with the running track 111 and is attracted magnetically thereto.

The attraction between the at least one first ferromagnetic implant and the running track 111 securely anchors the bottom edge 112 of the tablet PC 110 seated in the mounting frame 105. Since the entire continuum of the running track 111 provides such attraction, the edge of the mounting frame 105 can be positioned anywhere between the front edge of the first outer covering face 101 and a point nearing the rear edge thereof, providing a continually variable viewing positioning of the tablet PC 110 through a wide variety of angles.

Figure 3:
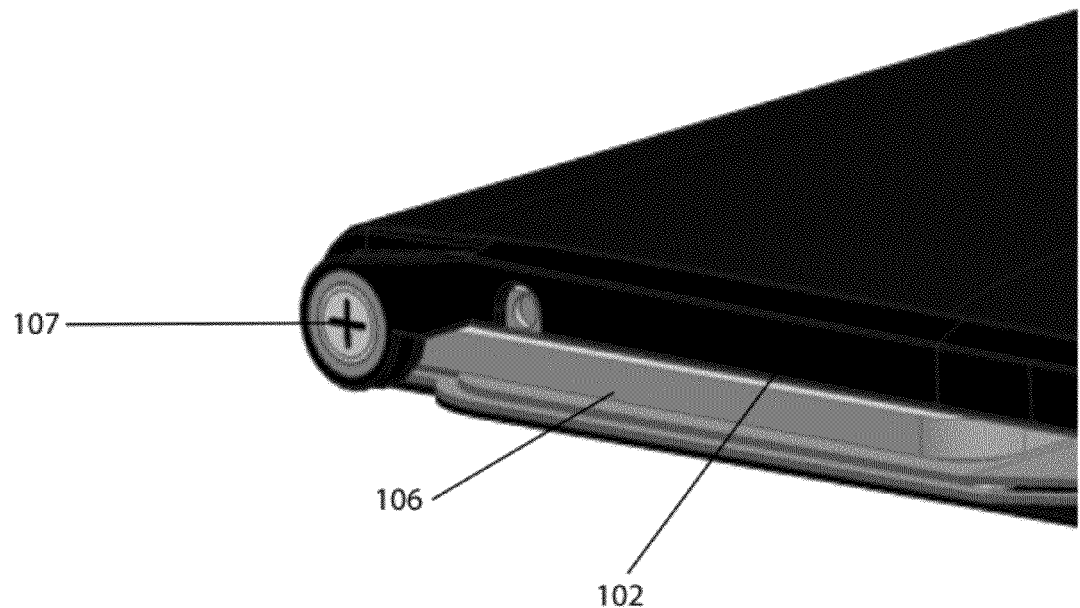
FIG. 3 is a detailed perspective view of a cover for a tablet PC as disclosed, in a closed configuration, with an integral keyboard thereof hinged abutting a tablet PC seated therein.
Figure 4:
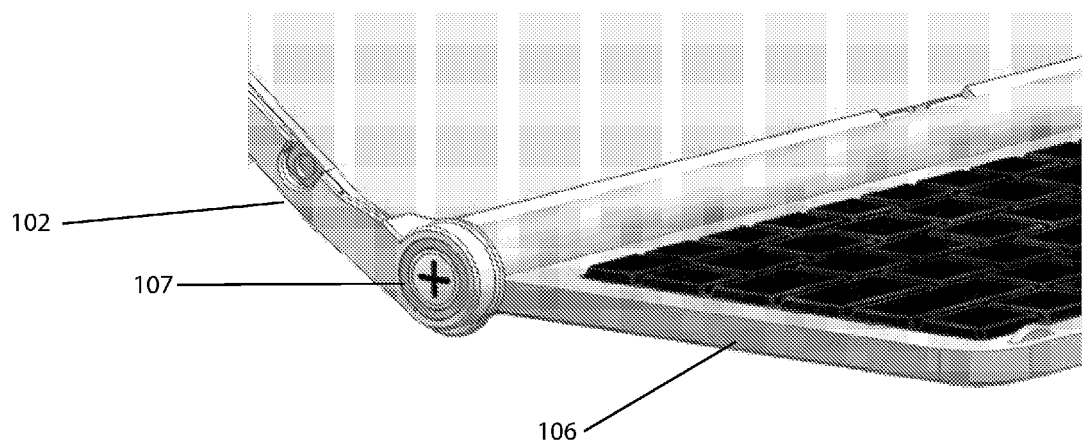
FIG. 4 is a detailed perspective view of a cover for a tablet PC as disclosed, in an open configuration, with an integral keyboard thereof hinged away from a tablet PC seated therein.

As well, the barrel hinge 107 comprises, embedded therein, at least one detectable implant (not shown). A circuit board encased in the keyboard component 106 bears a sensor which aligns with the at least one detectable implant when the tablet PC cover 100 is collapsed, as shown in FIG. 3, and is separated from the at least one detectable implant when the tablet PC cover 100 is deployed for use, as shown in FIG. 4.

Proximity of the detectable implant and the sensor can be interpreted by the embedded system of the keyboard component 106 as indicating collapse of the tablet PC cover 100, and can accordingly trigger activation of features associated with a collapsed cover, such as system shutdown or suspension mode, and shutdown of the keyboard component. Thus, no dedicated action is required to secure the system for transport or storage. Additionally, separation of the detectable implant from the sensor, as when the tablet PC cover 100 is opened for use, can be interpreted by the embedded system of the keyboard component as indicating deployment of the tablet PC cover 100, and can accordingly trigger activation of features associated with a deployed cover, such as system startup or resumption, and startup of the keyboard component 106. Thus, no dedicated action is required to activate the system for use.

It is to be noted that the keyboard component as disclosed can connect to the tablet PC by internal or external cable connection, Bluetooth or other wireless protocol, or other form of connection as required.

While the invention has been described by way of example and in terms of preferred embodiment, it is to be understood that the invention is not limited thereto. To the contrary, it is intended to cover various modifications and similar arrangements (as would be apparent to those skilled in the art).

What is claimed is:

1. A cover for a tablet PC with an integral keyboard, the cover for the tablet PC comprising: a first outer covering face hinged on a second outer covering face; wherein the first outer covering face is planar and rigid, forming a back side of the cover when collapsed for storage or transport; and the second outer covering face is planar and rigid but scored longitudinally so as to present at least two planar sections, which, by hinging along the scoring, form a variable angle therebetween and the second outer covering face forms a front side of the cover when collapsed for storage or transport; between the two outer covering faces, a resilient mounting frame hinging on the keyboard component along a longitudinal axis of the tablet PC cover, whereby when the tablet PC cover is collapsed, the hinging of the resilient mounting frame and keyboard component snugly abuts the inner side of the hinge connecting the two outer covering faces; wherein the resilient mounting frame is attached on its rear side to the portion of the second outer covering face between the longitudinal scoring and the outer edge thereof, hinging along the scoring and supported by the unattached section of the second outer covering face between the longitudinal scoring and the hinging with the first outer covering face, and wherein the resilient mounting frame, on its surface away from the second outer covering face, comprises a fixing rim and an ejection assembly, snugly securing the tablet PC seated therein, while an operating touch panel and all controls of the tablet PC are exposed and functional, the tablet PC secured within the fixing rim by at least resilient tension provided thereby and the ejection assembly; and wherein, when deployed, the keyboard component is supported on the plane of the inside of the first outer covering face, which rests directly on a supporting surface, and wherein a running track comprising a strip of metallic material is encased within the first outer covering face, running between and perpendicular to the hinging of the resilient mounting frame and keyboard component and the opposite outside edge thereof and the keyboard component has, embedded in its base, at least one first ferromagnetic implant, whereby when the keyboard component is deployed for use, the at least one first ferromagnetic implant aligns with the running track and is attracted magnetically thereto; and wherein, the hinging of the resilient mounting frame and keyboard component comprises, embedded therein, at least one detectable implant, and a circuit board encased in the keyboard component bears a sensor which aligns with the detectable implant when the tablet PC cover is collapsed, and is separated therefrom when the tablet PC cover is deployed for use wherein the circuit board is configurable to initiate actions upon alignment with the detectable sensor, and separation therefrom.

2. The cover for a tablet PC with an integral keyboard as claimed in claim one, wherein the ejection assembly is situated at the essential center of the longitudinal edge opposite the hinging of the resilient mounting frame and keyboard component, and comprises a contact opening with at least one clip on either side thereof, the contact opening exposing a portion of the rear side of the tablet PC when seated therein, and such that pressure from the rear on the exposed portion of the rear surface of the tablet PC while bracing the edge of the fixing rim releases the tablet PC by separating the fixing rim from the hold thereof and simultaneously releasing the clips.

3. The cover for a tablet PC with an integral keyboard as claimed in claim one, wherein the detectable implant comprises a ferromagnetic element, and the sensor which aligns with the detectable implant when the tablet PC cover is collapsed, and separating therefrom when the tablet PC cover is deployed for use detects the magnetism thereof.

4. The cover for a tablet PC with an integral keyboard as claimed in claim one, wherein the keyboard component as disclosed connects to the tablet PC by internal or external cable connection, Bluetooth or other wireless protocol, or other form of connection as required.

\* \* \* \* \*